Patented Mar. 14, 1950

2,500,843

UNITED STATES PATENT OFFICE 2,500,843

COMPOSITION OF UREA-FORMALDEHYDE AND ORGANOSILICON COMPOUND

Charles A. MacKenzie, Montclair, and John B. Rust, West Orange, N. J., assignors, by direct and mesne assignments, of one-half to Ellis-Foster Company, a corporation of New Jersey, and one-half to Montclair Research Corporation, a corporation of New Jersey No Drawing. Application March 10, 1944, Serial No. 525,950

5 Claims. (Cl. 260—45.2)

This invention relates to compositions containing urea-formaldehyde type resins and organosilicon derivatives, to lacquers and molding compositions containing such compositions, to articles carrying such lacquer coatings, to molded articles produced with such compositions, and to methods of making such compositions and articles.

Urea-formaldehyde type resins have been employed in baking lacquers of good hardness, gloss and chemical resistance. Such resins have also been blended with other types of resins such as alkyd resins, phenol-aldehyde resins, polyvinyl resins, polystyrene resins, polyacrylates and the like. Such blended resins have varying degrees of hardness. heat-resistance, color retention and the like. While such blends have proved very desirable for many purposes, their utilization along certain lines is restricted by the fact that they do not always possess the properties desired for certain special purposes.

Among the objects of the present invention is the production of compositions utilizable for various purposes, which compositions contain urea-formaldehyde type resins modified by organo-silicon derivatives to give compositions of novel characteristics, as for example, in baking lacquers of improved characteristics of color retention, gloss, heat-resistance, chemical-resistance and the like.

Other objects include the production of compositions containing urea-formaldehyde type resins with organo-silicon derivatives particularly selected from the groups of organic siliconols, organic silicon acylates, and organic alkoxy silicons.

Still other objects include the production of durable, hard, clear, glossy, baking lacquers containing organic alkoxy silicons, particularly alkyl alkane orthosiliconates.

Further objects of this invention include the production of plasticized urea-formaldehyde type lacquers and of high heat resistant materials possessing excellent electrical properties.

Still other and further objects of the invention will be apparent from the description set forth below, it being understood that this more detailed description is given by way of illustration and explanation only, and not by way of limitation, since various changes therein may be made by those skilled in the art without departing from the scope and spirit of the present invention.

In accordance with the present invention, compositions are produced by modifying urea-formaldehyde type resins with organo-silicon derivatives, the compositions desirably being produced by utilizing a solvent in which the resin and the organo-silicon derivative are blended and desirably the solvent thus employed is a mutual solvent for the components. The compositions thus produced may desirably be employed for lacquer purposes or may be utilized in producing molded articles as hot pressed articles with or without fillers incorporated into the compositions either before or after removal of solvents and then subjected to for example, hot pressing operations.

It has been found that urea-formaldehyde type resins such as urea-formaldehyde resins themselves or resins produced from urea derivatives such as dicyandiamide, guanidine, alkyl urea or ureas, thiourea or alkyl thioureas, biguanide, phenyl urea and the like, have restricted compatibility with organo-silicon derivatives and accordingly the production of the most desirable compositions particularly when utilized for lacquer purposes will contain the organo-silicon derivatives in amounts within the range in which they are compatible with the particular type of urea-formaldehyde type resin utilized.

Thus it has been found that only relatively minor amounts of alkyl silicon hydroxides or other organic siliconols or organic silicon acylates such as the alkyl silicon acylates, may be blended with such urea-formaldehyde resins to obtain clear, or only slightly hazy blends. Where a self-resinifying organo-silicon derivative is employed of the siliconol or acylate type, the amount of the latter should be 5% or less in the production of relatively clear blends. With non-resinifying organo-silicon derivatives of the type just mentioned, a plasticizing effect may be obtained with the stated urea-formaldehyde type resins in which event more than 5% of the organo-silicon derivatives, particularly the alkyl silicon derivatives may be employed, but even here preferably less than 10% of the organo-silicon derivative of the type stated is utilized in the production of clear or only slightly hazy blends.

The organo-siliconols are silicon hydroxides containing substituent organic groups which may be selected from alkyl, alphyl, aryl, olifinyl, alkenyl, alkynyl, aralkyl, alkaryl, and cycloalkyl. In the production of curable combinations, as for example, with the alkyl silicon hydroxides, the average of alkyl groups per silicon atom is desirably maintained between the limits of 0.5 to 2.0 alkyl groups per silicon atom. More paticularly the organo-siliconols may be alkyl siliconols desirably where the ratio of alkyl groups to silicon is as set forth above.

The organo-silicon acylates may have the formula $R_xSi(OH)_y(OR'')_z$, where R is an organic group as specified above and R'' is an acyl group, x is a positive number less than 4, either an integer or fractional, $y+z$ is equal to $4-x$ and $z$ is not zero. More particularly, such acylates may have the formula $R_xSi(OR'')_{4-x}$, where R, R'' and x have the values set forth immediately above.

While as indicated above, the siliconols and acylates have rather restricted compatibility, it has been found that the organic alkoxy silicons paticularly the alkyl alkoxy silicons such as the alkyl alkane siliconates, such as ethyl alkane siliconate, have excellent compatibility with the urea-formaldehyde type resins, in amounts not exceeding 50% based on the weight of the resin to produce clear or only slightly hazy films. Such organo alkoxy silicons may be represented by the general formula $R_xSi(OH)_y(OR')_z$, where R and R' are the same or different radicals selected from the groups indicated above in connection for the corresponding substituents in the siliconols, x is less than 4, $y+z$ is equal to $4-x$, and $z$ is not zero, x being either an integer or fraction. More particularly such alkoxy silicons will have the formula $R_xSi(OR')_{4-x}$, where R, R' and x have the values set forth immediately above in the general formulation of the alkoxy silicons.

Where the organo-silicon derivatives contain reactive groupings such as OH groups in the siliconols or partial acylates, or free acid groups as in the production of acylates with polycarboxylic acids, such organo-silicon derivatives may act as internal plasticizers. As indicated above, the organo-silicon derivatives utilized need not in themselves be resinifying for utilization in accordance with the present invention.

The organo-silicon derivatives utilized in accordance with the present invention may be produced by any desirable methods and include methyl methane orthosiliconate, ethyl methane orthosiliconate, ethyl ethane orthosiliconate, ethyl propane orthosiliconate, ethyl butane orthosiliconate, ethyl pentane orthosiliconate, diethyl diethoxy silicon, methyl methoxy silicon, phenyl ethoxy silicon, and the like. Organo-silicon derivatives may be utilized in the form of monomeric products, or as polymeric products, or alkoxy derivatives may be partially hydrolyzed before blending with the urea-formaldehyde type resin, or partial hydrolysis may be carried out during the formation of the blended resins. Alkoxy derivatives of the type referred to above may be utilized or corresponding derivatives obtained from disilicon hexahalides, silicon oxyhalides, polysilicon polyhalides and the like may be employed.

Thus the silicon derivatives may be made by methods utilizing Grignard reagents or in any desired way.

For example, mixed alkyl silicon hydroxides may be utilized since by the use of mixed alkyl derivatives, the properties of a given alkyl silicon oxide may be modified in a given direction to enhance utility for particular purposes. For example, certain hard, brittle methyl derivatives may be modified by including some of the butyl derivative to give a product having increased flexibility. Or minor amounts of cetyl derivatives may be incorporated with the methyl to bring about an internal plasticization. Thus the control of flexibility or plasticity of any given alkyl derivatives may be obtained by the presence of a different alkyl derivative enhancing the particular property desired and this is particularly important in connection with control of properties like flexibility and plasticity. The use of alkyl derivatives containing at least three carbon atoms in the alkyl group is particularly important in thus modifying the desired characteristics of the compounds or compositions and most desirably, therefore, with alkyl derivatives containing methyl or ethyl groups, there is desirably employed alkyl groups containing three or more carbon atoms such as propyl, butyl, etc., where it is desired to use such mixed alkyl derivatives.

Such mixed derivatives may be made by the use of mixed alkyl magnesium halides reacted with silicon tetrachloride or other analogous silicon derivatives, followed by hydrolysis and dehydration. Or the alkyl silicon hydroxides may be produced separately and mixed in desired proportions before dehydration. Any means for making the mixed-alkyl derivatives may be employed. Similarly, alkyl silicon derivatives and other related compounds may be produced from disilicon hexahalides, silicon oxyhalides, polysilicon polyhalides and the like, by appropriate reactions.

Other types of organo-silicon derivatives includes siliconols which have been acylated, as by conversion into esters, either in the treatment of the siliconols as such or in dehydrated or partially polymerized condition and either utilized as such or converted into polymeric substances as by the application of heat or catalysts, particularly using acid or basic substances, or by combination of such methods. Such esters may be produced in the pure state or they may be made partially polymeric esters. In the pure state they may take the configuration given in the following formula

while the esterified polymer may have the configuration

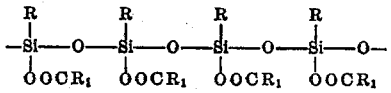

in which formulas R and $R_1$ may be the same or different organic substituents, particularly such as alkyl, unsaturated aliphatic, aryl, alphyl, aralkyl, or cyclo-alkyl groups including methyl, ethyl, propyl, isopropyl, butyl, isobutyl, amyl, hexyl, heptyl, octyl, vinyl, allyl, butenyl, cyclohexyl, propargyl, phenyl, tolyl, xenyl, and substituted groups such as chorpropyl and chlorphenyl. Such esters include acetates which cure or polymerize by the elimination of acid anhydride such as acetic anhydride, etc. The production of such acylates may desirably be carried out in the presence of pyridine or other tertiary amines such as quinoline, alpha picoline, dimethyl benzyl amine, dimethyl aniline, trimethyl-, triethyl-, etc. amine, ethyl morpholine, and the like utilized in the preparation of such acylates from the alkyl siliconols in the presence of acid chlorides. Besides acetic acid, other exemplary acylating agents include other acids such as stearoyl chloride, maleic anhydride, chlorpropionyl chloride, phthalic anhydride, benzoyl chloride, etc. Among solvents that may particularly be used desirably with such acylates there are included hexane, xylene, etc.

Among methods that are utilizable in producing the organo-silicon derivatives, in lieu of utilizing Grignard reagents as one of the reacting components, such derivatives may be produced upon reaction of an organic halide such as alkyl or aryl halide with the corresponding silicon compound such as a silicon halide in the presence of magnesium metal to form corresponding silicon derivatives which heretofore were made only by two-step Grignard reactions. The products produced by such one-stage reactions are usually complex mixtures and in some cases at least differ substantially from the reaction products obtained by utilizing the same corresponding ingredients in two-step Grignard reactions. Such products produced by the one-stage reaction utilizing either magnesium or lithium in carrying out the reaction, may be hydrolyzed and heat treated to be converted into hard, tough, plastic materials or the hydrolytic products may be dissolved in suitable solvents. The reaction may be carried out in the presence of aliphatic ethers as solvents or in other ways and may also be carried out in the absence of any solvent for the reacting ingredients. The reactions in the presence of the magnesium or lithium may be carried out without first forming any Grignard reagent at all in the reacting mixture, or a small portion of Grignard or related compound may be present and formed from the reacting components in part, before the main body of the reacting components are utilized.

Among solvents that may be utilized in connection with such organo-silicon derivatives there are included hydrocarbon solvents such as aliphatic and aromatic compounds, such as hexane, benzene, toluene, etc.; ethers such as dimethyl, diethyl, diisopropyl, dibutyl ethers or mixed ethers; esters such as ethyl, butyl or amyl acetates; alcohols, etc. The alcoholic solvents include both the aliphatic alcohols such as methanol, propanol, butanol, phenols such as phenol, cycloaromatic or alicyclic alcohols such as cyclohexanol, and the like. Heat treatment of the organo-silicon derivatives in the presence of such hydroxy compounds results in producing ether type derivatives.

As illustrating solvents that may be utilized in producing blends of the stated components, there may be particularly emphasized the glycol ethers such as ethylene glycol mono-n-butyl ether; but other solvents include alcohols such as methanol, ethanol, isopropanol, butanol, pentanol, octanol, and the like, or esters such as ethyl acetate, ethyl lactate, butyl acetate, and the like, or ketones such as acetone, methyl isopropyl ketone and so forth, or hydrocarbons such as benzene, toluene or xylene, and the like. These latter are latent solvents and must be used in conjunction with ketones, esters, alcohols, and so forth.

The compositions of this invention may desirably be produced by utilizing the chosen organo-silicon derivative with the urea-formaldehyde type resins, particularly urea-formaldehyde resins, preferably blending the materials by means of a solvent, the compositions being utilized either retaining the solvent therein, or after removal of the solvent or some components of the solvents where a composite solvent mix is employed. The manner of utilization depends on the particular purpose to which the composition is to be put. Lacquers are readily produced and may be ground and formulated in any acceptable manner. Both as lacquers and air drying varnishes, very desirable compositions may be produced. They may be compounded with any desired pigment, lake or dye. Applied to desired articles of manufacture, lacquer type coatings are produced following drying operations for removal of any solvents present to produce coatings of novel properties as illustrated in the examples set forth below.

Or these compositions may be used in the preparation of molding compositions, as for example, in hot pressing. The compositions per se without fillers may be employed, or fillers both organic and inorganic may be incorporated either in the presence of the solvent or after removal thereof. Where solvents are retained in preparing such molding compositions, they may be subsequently removed and then the dried materials or compositions molded under heat and pressure.

The compositions may be blended with other materials such as resins including for example, phenol-aldehyde resins, aniline-aldehyde resins, acetone-formaldehyde resins, alkyd resins, cumarone resins, vinyl resins, styrene resins, acrylate resins, including polymeric esters of acrylic and methacrylic acids, diallyl maleate, allyl esters of polybasic acids, and the like.

Most desirably, the blends are utilized in the proportions indicated above to give clear or only slightly hazy films or compositions. In certain cases, where only limited compatibility of the components is required, the acylates and alkoxy silicon types of derivatives may be utilized in proportions beyond those which give clear or only slightly hazy compositions, films or molded products, but generally the best results are obtained when clear or only slightly hazy blends are produced.

The following examples are given to illustrate the process of the present invention and the products obtainable therefrom. All proportions are in parts by weight.

*Example 1.*—Three parts of dimethylol urea were mixed with 40 parts of n-butanol and 0.3 part of an amyl silicon hydroxide obtained from the hydrolysis of the product formed by the one step reaction of one mole of n-amyl bromide and one mole of silicon tetrachloride. Another mixture was made using 0.16 part of the above n-amyl silicon hydroxide. The former lacquer contained 10% of amyl silicon hydroxide based on the weight of dimethylol urea whereas the latter contained 5%. Both solutions were heated under a condenser and water and excess butanol distilled off. Clear lacquers were obtained in both cases, but on pouring films and baking them at 140° C. for 1 hour, the film containing 10% of amyl silicon hydroxide was cloudy and opaque whereas the one containing 5% of amyl silicon hydroxide was hard and almost clear, showing only a trace of cloudiness.

*Example 2.*—Three parts of dimethylol urea and 1 part (25% based on non-volatiles) of ethyl ethane orthosiliconate ($C_2H_5Si(OC_2H_5)_3$) prepared by the action of ethyl magnesium bromide on ethyl orthosilicate were mixed with 40 parts of n-butanol and 10 parts of ethylene glycol mono-n-butyl ether. One-tenth part o-phosphoric acid was added and the excess butyl alcohol and the water were removed by distillation. A clear lacquer was obtained. A film was cast on a glass plate and baked at 140° C. for 1 hour. In contrast to the alkyl silicon hydroxide, a clear hard film was obtained in this case.

*Example 3.*—Three parts of dimethylol urea and 1.6 parts (35% based on non-volatiles) of ethyl ethane orthosiliconate prepared as in Example 2 were mixed with 40 parts of n-butanol and 10 parts of ethylene glycol mono-n-butyl ether. The excess butanol and the water were distilled off, leaving a clear lacquer of high solids content. A film was poured and baked at 140° C. for 1 hour. It was clear and hard.

*Example 4.*—Three parts of dimethylol urea and 2 parts of ethyl ethane orthosiliconate prepared as in Example 2, were mixed with 40 parts of n-butanol and 10 parts of ethylene glycol mono-n-butyl ether. The mixture was heated and water and butanol distilled off to obtain a clear lacquer solution. A film on baking at 140° C. for 1 hour was hard and clear in the main part with a fringe of cloudiness on the edges. This film was prepared from a solution originally containing 40% ethyl ethane orthosiliconate based on non-volatiles. A film in which the content of ethyl ethane orthosiliconate was raised to 45% was cloudy in the main part.

While organo-siliconols, organo alkoxy silicons, and organo-silicon acylates are particularly emphasized above for inclusion in the compositions for producing blends with urea-formaldehyde type resins, it is not intended that the organo-silicon derivatives must be utilized in exclusion of each other, but mixtures of two or more of the various types of organo-silicon derivatives utilized in the same composition, using two or more siliconols, alkoxy silicons, or acylates in the same composition, or mixtures of one type of organo-silicon derivatives with those of another in which event the compatibility can be varied.

Having thus set forth our invention, we claim:

1. A composition comprising a urea-formaldehyde resin, a solvent, and a silicon derivative selected from the group consisting of diethyl diethoxy silicane and an alkyl alkane orthosiliconate in which the alkane has from one to five carbon atoms and the alkyl from one to two carbon atoms, said silicon derivative being present in an amount of less than 50% on the weight of the resin.

2. A composition comprising a urea-formaldehyde resin, a solvent, and diethyl diethoxy silicane, the amount of the latter being less than 50% based on the weight of the resin.

3. A composition comprising a urea-formaldehyde resin, a solvent, and ethyl methane orthosiliconate the amount of the latter being less than 50% based on the weight of the resin.

4. A composition comprising a urea-formaldehyde resin, a solvent, and ethyl ethane orthosiliconate the amount of the latter being less than 50% on the weight of the resin.

5. A composition comprising a urea-formaldehyde resin, a solvent, and an ethyl alkane orthosiliconate the alkane having from 1 to 5 carbon atoms, the amount of the ethyl alkane orthosiliconate being less than 50% based on the weight of the resin.

CHARLES A. MacKENZIE.
JOHN B. RUST.

REFERENCES CITED

The following references are of record in the file of this patent:

UNITED STATES PATENTS

| Number | Name | Date |
|---|---|---|
| 2,053,474 | Graves | Sept. 8, 1936 |
| 2,258,218 | Rochow | Oct. 7, 1941 |
| 2,313,678 | Simons | Mar. 9, 1943 |
| 2,371,050 | Hyde | Mar. 6, 1945 |
| 2,375,998 | McGregor | May 15, 1945 |
| 2,382,082 | McGregor | Aug. 14, 1945 |